(12) United States Patent
Spalart et al.

(10) Patent No.: US 9,827,952 B2
(45) Date of Patent: Nov. 28, 2017

(54) VEHICLE EXTERNAL COMPONENT HAVING REDUCED VORTEX SHEDDING

(71) Applicant: The Boeing Company, Chicago, IL (US)

(72) Inventors: Philippe R. Spalart, Redmond, WA (US); Gail M. Barker, Seattle, WA (US); Brandon L. Bertolucci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 14/501,375

(22) Filed: Sep. 30, 2014

(65) Prior Publication Data
US 2016/0090065 A1  Mar. 31, 2016

(51) Int. Cl.
| | | |
|---|---|---|
| *B60S 1/34* | (2006.01) | |
| *B64C 1/14* | (2006.01) | |
| *B60S 1/32* | (2006.01) | |
| *B60S 1/38* | (2006.01) | |
| *B60S 1/04* | (2006.01) | |

(52) U.S. Cl.
CPC .......... *B60S 1/3425* (2013.01); *B60S 1/0408* (2013.01); *B60S 1/32* (2013.01); *B64C 1/14* (2013.01); *B60S 1/3806* (2013.01)

(58) Field of Classification Search
CPC .................. B60S 1/3806; B60S 1/0408; B60S 1/3425–1/344
See application file for complete search history.

(56) References Cited

U.S. PATENT DOCUMENTS

| | | | | |
|---|---|---|---|---|
| 4,400,845 A | * | 8/1983 | Noguchi ............... | B60S 1/3806 15/250.201 |
| 4,782,547 A | * | 11/1988 | Mohnach ................ | B60S 1/522 15/250.04 |
| 4,989,290 A | * | 2/1991 | Hoshino ................... | B60S 1/32 15/250.201 |

(Continued)

FOREIGN PATENT DOCUMENTS

| | | |
|---|---|---|
| DE | 3424729 A1 | 2/1986 |
| FR | 2632897 A1 | 12/1989 |

(Continued)

OTHER PUBLICATIONS

International Search Report for related International Application No. 15184204; report dated Feb. 9, 2016.

*Primary Examiner* — Andrew A Horton
(74) *Attorney, Agent, or Firm* — Miller, Matthias & Hull LLP

(57) ABSTRACT

A windshield wiper arm is provided on an outside of an aircraft and positioned to directly engage an air flow while the aircraft is traveling. The wiper arm includes an arm portion coupled to the aircraft and having an arm exterior surface, the arm portion extending along an arm axis and defining an arm length. A bead extends outwardly from the arm exterior surface and defines a bead exterior surface, the bead being sized sufficiently to engage a boundary layer of the air flow. A wiper blade is coupled to the arm portion. The bead prevents separation of the boundary layer from the arm exterior surface, thereby to attenuate shedding of vortices and associated vibrations and noise.

19 Claims, 3 Drawing Sheets

(56) References Cited

U.S. PATENT DOCUMENTS

| | | | | |
|---|---|---|---|---|
| 5,086,534 A | * | 2/1992 | Journee | B60S 1/0408 |
| | | | | 15/250.201 |
| 5,402,964 A | | 4/1995 | Wygnanski | |
| 6,019,549 A | | 2/2000 | Blair et al. | |
| 6,158,079 A | * | 12/2000 | Shibata | B60S 1/34 |
| | | | | 15/250.201 |
| 6,453,505 B1 | * | 9/2002 | Terai | B60S 1/0408 |
| | | | | 15/250.201 |
| 6,622,339 B1 | * | 9/2003 | Zimmer | B60S 1/0408 |
| | | | | 15/250.201 |
| 7,967,253 B2 | | 6/2011 | Ferguson et al. | |
| 8,770,894 B1 | | 7/2014 | Allen et al. | |
| 2002/0020034 A1 | | 2/2002 | Choi | |
| 2004/0045116 A1 | * | 3/2004 | Siklosi | B60S 1/3801 |
| | | | | 15/250.451 |
| 2004/0080292 A1 | * | 4/2004 | Buchanan, Jr. | B60S 1/32 |
| | | | | 318/443 |
| 2008/0289137 A1 | * | 11/2008 | Ciaccio | B60S 1/32 |
| | | | | 15/250.201 |
| 2013/0117957 A1 | * | 5/2013 | Ku | B60S 1/4019 |
| | | | | 15/250.201 |

FOREIGN PATENT DOCUMENTS

| | | | | |
|---|---|---|---|---|
| FR | 2785248 A1 | | 5/2000 | |
| FR | 2938807 A1 | * | 5/2010 | ................ B60S 1/32 |
| GB | 2069826 A | * | 9/1981 | ........... B60S 1/3806 |
| JP | 2006117007 | | 5/2006 | |

* cited by examiner

VEHICLE EXTERNAL COMPONENT HAVING REDUCED VORTEX SHEDDING

FIELD

The present disclosure generally relates to external components or appendages attached to streamlined vehicles and, more specifically, to vehicle components modified to reduce the shedding of vortices they may create when subjected to air flows, as well as associated vibrations and noise.

BACKGROUND

Bodies that encounter fluid flow may cause vortex-induced vibration. More specifically, air or water flowing at sufficient velocity past a cylindrical, near-cylindrical or in general bluff body may create vortices downstream of the body. The vortices may detach periodically from the two sides of the body—a phenomenon called "vortex shedding." Because the vortices have reduced pressure in their core, forces are created during vortex shedding that are directed toward the locations of the vortices. These forces can cause the body itself to oscillate, which is common for flexible antennas, or apply oscillatory loads to other parts of the vehicle, which is common for the skin or windows of the vehicle. If the frequency of the vortex shedding matches the resonance frequency of the body, the body may resonate at harmonic oscillations. Additionally, the pressure waves associated with the vortices may produce unwanted noise that may be observed inside the cabin.

In the field of aviation, certain parts of an aircraft such as probes, antennas and air inlets may be disposed outboard of the cabin and therefore exposed to a rapid air flow. A windshield wiper assembly, for example, may include a wiper arm that is positioned to engage a wiper blade with the exterior of a windshield. The wiper arm may include an arm portion that is disposed outboard of the cabin and therefore subject to the air flow generated around a nose of the aircraft during travel. On some aircraft and at certain airspeeds, noise may be observed in the cabin that may appear to be emanating from the vicinity of the wiper arms and therefore may be attributed to vortex shedding from these arms. In some instances the noise may be attenuated by reinstallation of the same wiper arm or replacement with a new wiper arm, however a reliable solution has not heretofore been proposed. A test flight with the wipers removed showed that the noise was eliminated, which confirmed the role of the wipers in creating the noise.

SUMMARY

In accordance with one aspect of the present disclosure, a component is disposed on an external side of a vehicle and positioned to directly engage an air flow while the vehicle is traveling. The component includes an arm coupled to the vehicle and having an arm exterior surface, the arm extending along an arm axis and defining an arm length. A bead extends outwardly from the arm exterior surface and defines a bead exterior surface, the bead being configured to engage a boundary layer of the air flow.

In accordance with another aspect of the present disclosure, a method is provided of reducing vortex shedding produced by an air flow passing over a component having an arm disposed on an outboard side of a vehicle. The method comprises positioning a bead along an exterior surface of the arm, the bead defining a bead exterior surface extending outwardly from the arm exterior surface, and using an appropriate size for the bead to engage a boundary layer of the air flow.

In accordance with a further aspect of the present disclosure, a wiper arm is disposed on an outside of an aircraft and positioned to directly engage an air flow while the aircraft is traveling. The wiper arm includes an arm portion coupled to the aircraft and having an arm exterior surface, the arm portion extending along an arm axis and defining an arm length. A bead extends outwardly from the arm exterior surface and defines a bead exterior surface having an arcuate profile, the bead having a size sufficient to engage a boundary layer of the air flow. A wiper blade is coupled to the arm portion.

In another aspect of the disclosure that may be combined with any of these aspects, the bead may extend substantially parallel to the arm axis and defines a bead length that is at least approximately 50% of the arm length.

In another aspect of the disclosure that may be combined with any of these aspects, the bead has a height, the arm has a width, and a ratio of bead height to arm width which is approximately 1 to 5%.

In another aspect of the disclosure that may be combined with any of these aspects, the bead may extend along a bead axis, and in which a distal half of the bead exterior surface is located a radius distance from the bead axis.

In another aspect of the disclosure that may be combined with any of these aspects, the radius distance may be approximately 0.025 inches.

In another aspect of the disclosure that may be combined with any of these aspects, the arm exterior surface may include an inward portion oriented toward the outboard side of the vehicle and an outward portion oriented away from the outboard side of the vehicle, and the bead may be located in the inward portion of the arm exterior surface.

In another aspect of the disclosure that may be combined with any of these aspects, a second bead may extend outwardly from the outward portion of the arm exterior surface and define a second bead exterior surface.

In another aspect of the disclosure that may be combined with any of these aspects, the bead may define first and second ends, and the bead exterior surface may extend continuously from the first end to the second end.

In another aspect of the disclosure that may be combined with any of these aspects, the bead may be formed integrally with the arm The features, functions, and advantages that have been discussed can be achieved independently in various embodiments or may be combined in yet other embodiments further details of which can be seen with reference to the following description and drawings.

Figure 1:
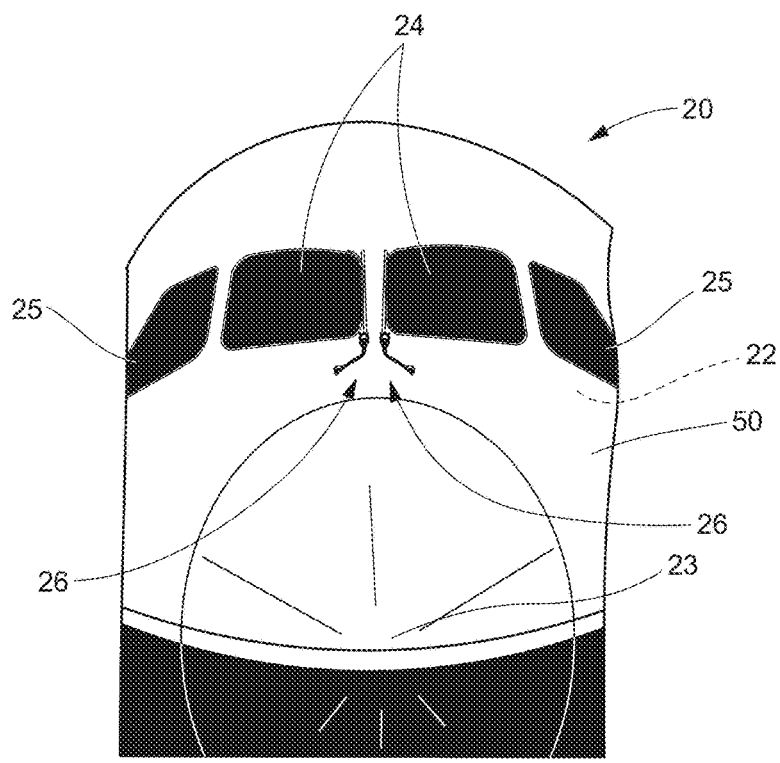
FIG. 1 is a front view of an aircraft including external components in the form of windshield wiper arms.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

For ease of understanding the orientation in the drawings, the terms "inside", "inboard", and "interior" shall refer to a direction oriented from the viewpoint of a person standing within the cabin of the aircraft, and the terms "outside", "outboard", and "exterior" shall refer to a direction oriented from the viewpoint of a person outside of the cabin observing the aircraft.

FIG. 1 illustrates an aircraft 20 defining an interior cabin 22 and a nose 23. An array of windshields 24 and side windows 25 is provided at the nose 23 and a pair of wiper assemblies 26 is provided adjacent two of the windshields 24 located near a center of the aircraft 20. Each wiper assembly 26 includes a wiper arm 28 coupled to a rotating shaft 30 for pivoting the wiper assembly 26 and a wiper blade 32 coupled to the wiper arm 28 and configured to engage an exterior of the windshield (FIG. 2).

Figure 2:
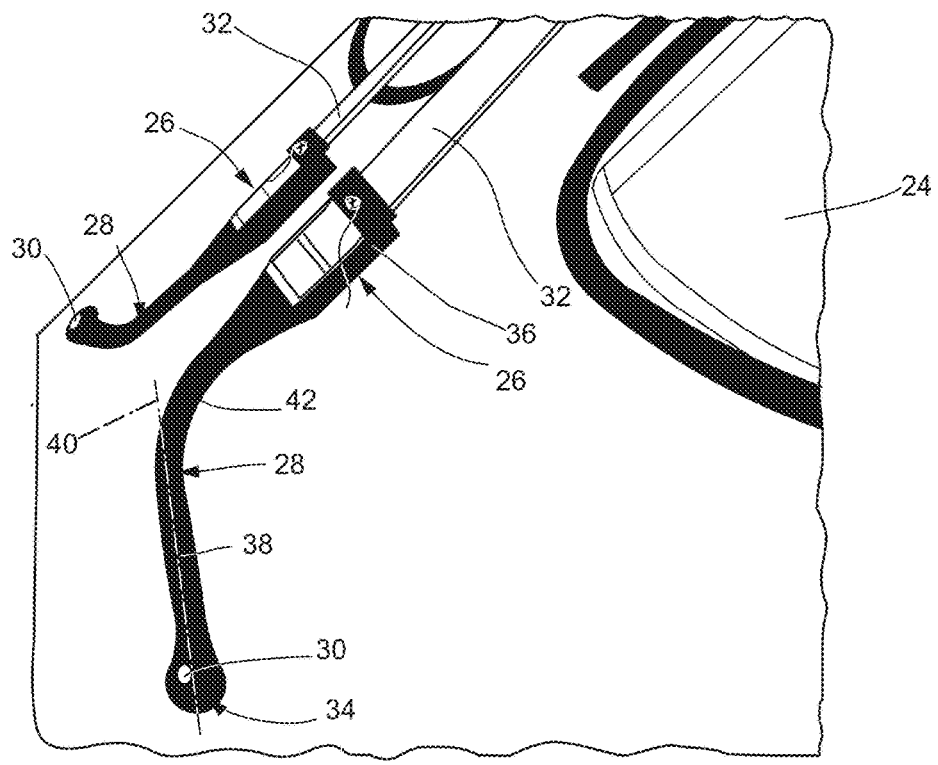
FIG. 2 is a perspective view of the windshield wiper arms of FIG. 1.

The wiper arms 28 are shown in greater detail in FIG. 2. In the illustrated embodiment, each wiper arm 28 includes a first connection end 34 for coupling to the rotating shaft 30 and a second connection end 36 configured to secure a wiper blade 32. Each wiper arm 28 further includes a substantially linear arm portion 38, extending along an arm axis 40, and an arcuate transition portion 42 between the first and second connection ends 34, 36. The arm portion 38 may define an arm length 44 as measured along the arm axis 40 (FIG. 3).

Figure 3:
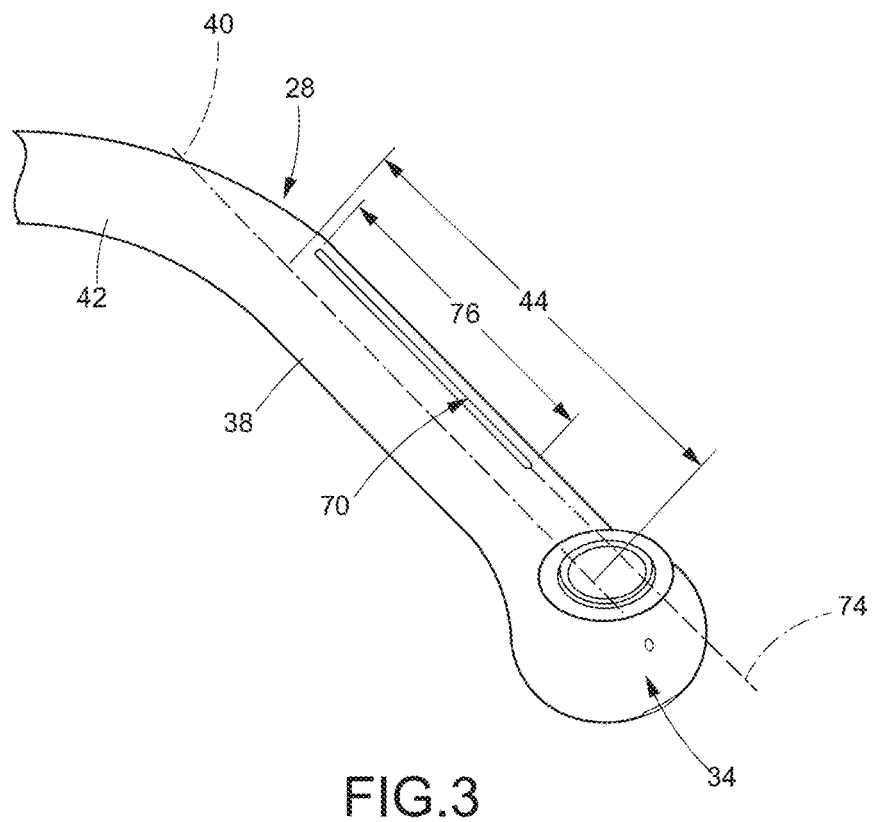
FIG. 3 is an enlarged perspective view of a lower portion of the wiper arm shown in FIGS. 1 and 2 showing a bead for reducing noise generated by the wiper arm.
Figure 4:
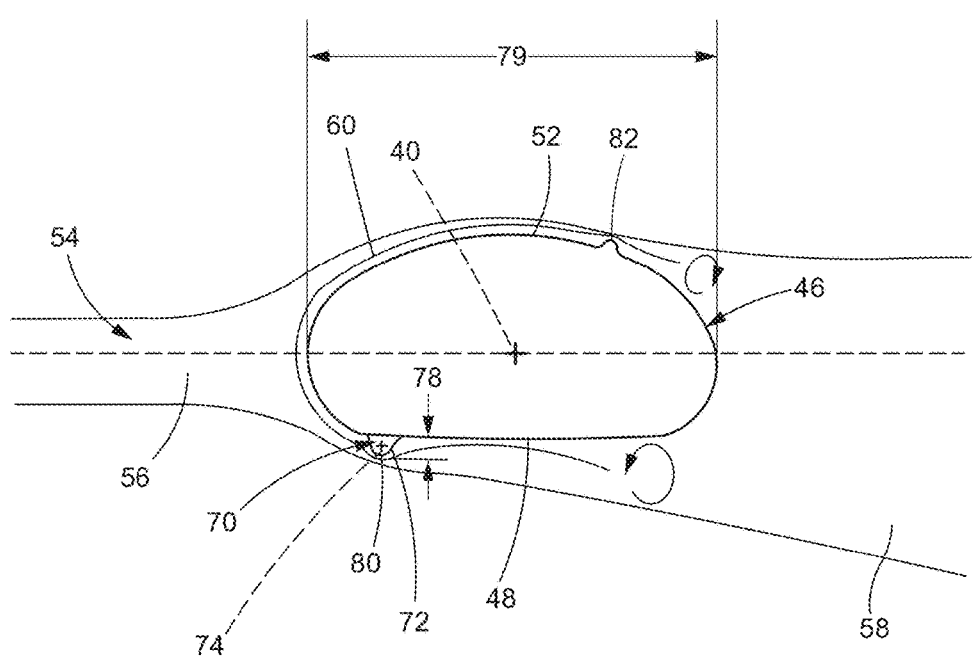
FIG. 4 is a side elevation view, in cross-section, of the lower portion of the wiper arm of FIG. 3, with an exemplary air flow directed over the arm portion.

As best understood with reference to FIGS. 3 and 4, the arm portion 38 of each wiper arm 28 may define an arm exterior surface 46 having a generally oval cross-sectional shape. The arm exterior surface 46 further may have an inward portion 48 oriented toward an outboard side 50 of the aircraft 20, and an outward portion 52 oriented away from the outboard side 50 of the aircraft 20.

FIG. 4 also illustrates an air flow 54 passing over the arm portion 38 from an upstream end 56 to a downstream end 58. In the illustrated embodiment, the air flow 54 creates includes a boundary layer 60 adjacent to the inward and outward portions 48, 52 of the exterior surface 46. An upstream part of the boundary layer 60 generally conforms to the shape of the exterior surface 46. As it traverses the arm portion 38, the boundary layer 60 generally loses speed and may transition from laminar to turbulent flow. Ultimately, the boundary layer 60 leaves the exterior surface 46, which is known in the industry as boundary layer separation. This is due to the blunt shape of the arm cross-section 46. When the vortices generated by boundary layer separation oscillate coherently, that is, are shed from opposite sides of the component in a repeating alternating pattern with the distance between them close to the width of the wiper arm 38, they can produce pressure waves that may observed as noise inside the cabin 22.

A bead 70 may be provided on the arm portion 38 to mitigate or eliminate the potential for noise due to vortex shedding. As best shown in FIGS. 3 and 4, the bead 70 extends outwardly from the arm exterior surface 46 and defines a bead exterior surface 72 having an arcuate shape. In the illustrated embodiment, the bead exterior surface 72 has a semi-circular shape; however other arcuate or non-arcuate (i.e., linear or sharp) forms may be used. The bead 70 is sized sufficiently to trigger transition to turbulence and delay separation of the boundary layer 60 from the associated portion of the arm exterior surface 46, thereby preventing coherent oscillatory shedding of vortices from the arm portion 38.

More specifically, the bead 70 may be oriented and have a length configured to delay separation of the boundary layer 60 from the exterior surface 46. In the embodiment illustrated in FIGS. 3 and 4, for example, the bead 70 may extend linearly along a bead axis 74, however non-linear beads may also be used. Additionally, while the bead of FIGS. 3 and 4 extends continuously between its ends, a discontinuous bead, such as a row of discrete bumps of the same height, may alternatively be used. In some applications, the bead axis 74 may be substantially parallel (i.e., within ten degrees of parallel) to the arm axis 40. The bead 70 may also have a bead length 76 measured along the bead axis 74. In some embodiments, the bead length 76 may be at least 50% of the arm length 44. In other embodiments, the bead length 76 may be at least 70% of the arm length 44. In still other embodiments, the bead length 76 may be at least 80% of the arm length 44. Without being bound by theory, applicants believe that a longer bead length 76 relative to the arm length 44 increases the ability of the bead 70 to delay separation of the boundary layer 60.

Additionally, the bead 70 may be sized sufficiently to delay separation of the boundary layer 60 from the exterior surface 46. As best shown in FIG. 4, the bead exterior surface 72 projects outwardly from the arm exterior surface 46 by a bead height 78, while the arm portion 38 has an arm width 79. The bead height 78 may be selected relative to the arm width 79 to ensure delay of boundary layer separation. For example, a bead height ratio, which is a ratio of the bead height 78 to the arm width 79, may be used to size the bead 70. In some embodiments, the bead height ratio is approximately 1 to 5%. In a particular embodiment, the bead height 78 may be approximately 0.05 inches while the arm width may be approximately 1.25 inches, and therefore the bead height ratio for this embodiment is approximately 4%. Additionally, the bead exterior surface 72 may have a distal half 80 farthest from the exterior surface 46 of the arm portion 38, wherein each point of the distal half 80 is located a radius distance from the bead axis 74. In some embodiments, the radius distance may be approximately 0.025 inches.

The bead 70 may be located at various locations along the arm exterior surface 46. As shown in FIG. 4, for example, the bead 70 is located on the inward portion 48 of the exterior surface 46 and nearer an upstream end of the arm portion 38. Alternatively, the bead 70 may be located elsewhere in the inward portion 48 of the exterior surface 46, or even in the outward portion 52 of the exterior surface 46, as long as the bead 70 is not located at the extreme upstream or downstream ends of the arm exterior surface 46.

In an alternative embodiment, the arm portion 38 may be provided with a second bead 82. As shown in FIG. 4, the second bead 82 may be sized, oriented, and configured similar to the bead 70, however it may be located on the opposite side of the arm portion 38. For example, the bead 70 may be located in the inward portion 48 of the arm exterior surface 46, while the second bead 82 may be located in the outward portion 52 of the arm exterior surface 46. In this way, boundary layer separation may be delayed on both sides of the arm portion 38. While this alternative embodiment is shown in FIG. 4, it will be appreciated that a single bead 70 has been found to adequately reduce noise due to vortex shedding, and may provide a more advantageous appearance when located on the inward portion 48 of the arm exterior surface 46.

Various construction methods may be employed to provide the bead 70 on the arm portion 38. In the illustrated embodiments, the bead 70 is formed integrally with the arm portion 38, such as by molding the bead 70 at the same time as the arm portion 38. Alternatively, the bead 70 may be retrofit onto an existing arm portion 38 that was not originally provided with a bead. For example, the bead 70 may be coupled to the arm portion 38 using adhesive bonding, mechanical connection, or other coupling means.

While the bead 70 is described above in connection with the wiper arm 28, it will be appreciated that the bead 70 may be provided on other components that are susceptible to inducing vortex shedding when exposed to a fluid flow.

Additionally, a method may be provided of reducing vortex shedding produced by an air flow passing over a component having an arm disposed on an outboard side of a vehicle, such as the arm portion 38 of the wiper arm 28 provided on the aircraft 20. The method may include positioning the bead 70 along the exterior surface 46 of the arm, the bead defining a bead exterior surface 72 extending outwardly from the arm exterior surface 46 and having an arcuate profile. The bead 70 may be sized sufficiently to engage the boundary layer 60 of the air flow 54, so that when directing the air flow 54 over the arm exterior surface 46 and bead 70 may delay boundary layer separation from the arm.

Figure 5:
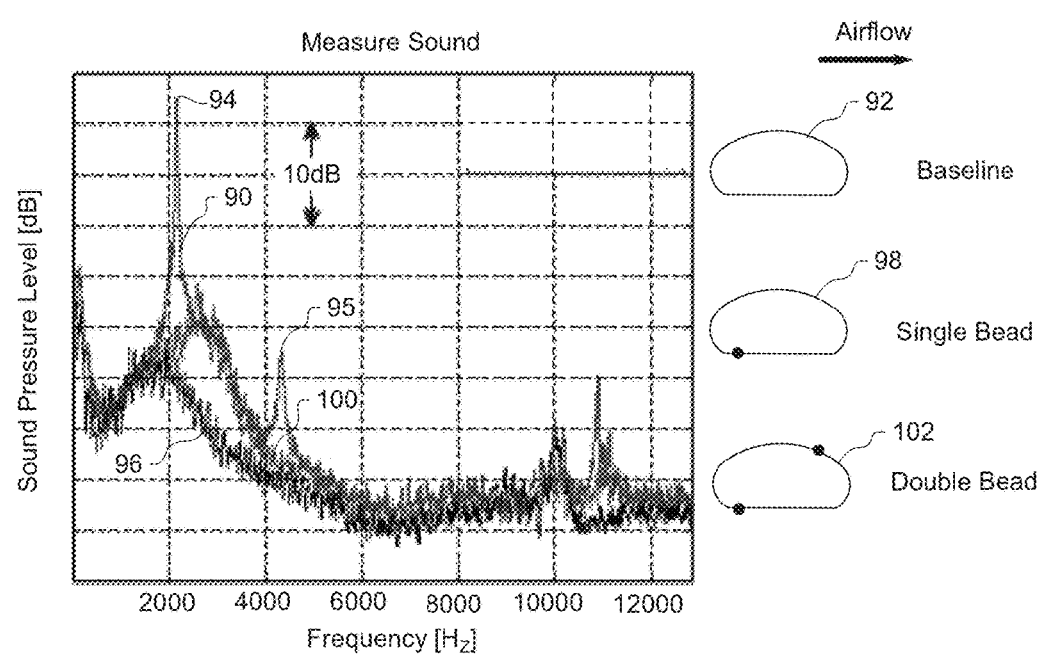
FIG. 5 is a graph illustrating the sound pressure level across a range of sound frequencies for a baseline wiper arm, a single bead wiper arm embodiment, and a double bead wiper arm embodiment.

FIG. 5 is a graph plotting the sound pressure level (in decibels) against a range of noise frequencies (in Hertz). The graph includes three lines. A first line 90 shows a baseline profile for an arm portion having no bead, as schematically illustrated in FIG. 5 and identified by reference numeral 92. The first line 90 includes a spike 94 in noise level near a noise frequency of 2000 Hertz. Applicants believe this spike is associated with the noise observed inside the aircraft cabin 22. The spike frequency of approximately 2000 Hertz was obtained during laboratory testing. During actual flight testing, the noise spike was observed at approximately 4000 Hertz. The difference between the laboratory and flight testing is due to the air flow velocity in the lab test being approximately ½ of the velocity in flight. The lab test air velocity was selected because the value of the kinematic viscosity of the air in the lab is about ½ of the value in flight, so this arrangement produced the same Reynolds number for the two flows. The Reynolds number controls the transition to turbulence, and therefore should match between the two situations. The spectrum for the baseline geometry also has a harmonic peak 95 at twice the fundamental frequency, and therefore near 4000 Hertz. A second line 96 illustrates a noise profile associated with an arm portion having a single bead positioned on an inward portion of the exterior surface, as schematically illustrated in FIG. 5 and identified by reference numeral 98. Additionally, a third line 100 illustrates a noise profile associated with an arm portion having two beads positioned on opposite sides of the exterior surface, as schematically illustrated in FIG. 5 and identified by reference numeral 102. Both the second and third lines 96, 100 show a reduced noise level at both the 2000 and 4000 Hertz frequencies, thereby indicating that the noise may be attenuated to a desirable level.

It will be appreciated that the foregoing description provides examples of the disclosed apparatus and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A component disposed on an external side of a vehicle defining a vehicle surface and positioned to directly engage an air flow while the vehicle is traveling, the component comprising:
    an arm coupled to the vehicle and having an arm exterior surface with an oval cross-sectional shape, the arm extending along an arm axis and defining an arm length, the arm being oriented relative to the vehicle surface so that the arm exterior surface includes an inward portion facing toward the vehicle surface, an arcuate outward portion facing away from the vehicle surface, an upstream end facing substantially normal to the vehicle surface, and a downstream end facing substantially normal to the vehicle surface, each of the inward and outward portions extending between the upstream and downstream ends; and
    a bead extending from one of the inward and outward portions of the arm exterior surface and defining a bead exterior surface, the bead substantially perpendicular to the vehicle surface, the bead being sized to engage a boundary layer of the air flow and create turbulence in the airflow downstream of the bead.

2. The component of claim 1, in which the bead extends substantially parallel to the arm axis and defines a bead length that is at least approximately 50% of the arm length.

3. The component of claim 2, in which the bead has a height, the arm has a width, and a ratio of bead height to arm width is approximately 1 to 5%.

4. The component of claim 2, in which the bead extends along a bead axis, and in which a distal half of the bead exterior surface is located a radius distance from the bead axis.

5. The component of claim 4, in which the radius distance is approximately 0.025 inches.

6. The component of claim 1, in which the bead extends from the inward portion of the arm exterior surface, and further comprising a second bead extending from the outward portion of the arm exterior surface and defining a second bead exterior surface configured to engage the boundary layer of the air flow and create turbulence in the air flow downstream of the second bead.

7. The component of claim 1, in which the bead defines first and second ends, and in which the bead exterior surface extends continuously from the first end to the second end.

8. The component of claim 1, in which the bead is formed integrally with the arm.

9. A method of reducing vortex shedding produced by an air flow passing over a component having an arm disposed on an outboard side of a vehicle and having an exterior surface with an oval cross-sectional shape, the method comprising:
   orienting the arm relative to the vehicle surface so that the exterior surface of the arm includes an inward portion facing toward the vehicle surface, an arcuate outward portion facing away from the vehicle surface, an upstream end facing substantially normal to the vehicle surface, and a downstream end facing substantially normal to the vehicle surface, each of the inward and outward portions extending between the upstream and downstream ends;
   positioning a bead along one of the inward and outward portions of the exterior surface of the arm, the bead defining a bead exterior surface extending from the arm exterior surface, the bead substantially perpendicular to the vehicle surface; and
   creating turbulence in the airflow downstream of the bead by sizing the bead to engage a boundary layer of the air flow.

10. The method of claim 9, in which positioning the bead comprises positioning the bead along the inward portion of the arm exterior surface.

11. The method of claim 10, further comprising:
   positioning a second bead along the exterior surface of the arm, the second bead defining a second bead exterior surface extending from the outward portion of the arm exterior surface; and
   creating turbulence in the airflow downstream of the second bead by sizing the second bead to engage the boundary layer of the air flow.

12. The method of claim 9, further comprising forming the bead integrally with the arm.

13. The method of claim 9, further comprising:
   forming the bead independently of the arm; and
   bonding the bead to the arm.

14. A wiper arm disposed on an outside of an aircraft defining an aircraft surface and positioned to directly engage an air flow while the aircraft is traveling, the wiper arm comprising:
   an arm portion coupled to the aircraft and having an arm exterior surface with an oval cross-sectional shape, the arm portion extending along an arm axis and defining an arm length, the arm portion being oriented relative to the aircraft surface so that the arm portion exterior surface includes an inward portion facing toward the aircraft surface, an arcuate outward portion facing away from the aircraft surface, an upstream end facing substantially normal to the aircraft surface, and a downstream end facing substantially normal to the aircraft surface, each of the inward and outward portions extending between the upstream and downstream ends;
   a bead extending from one of the inward and outward portions of the arm exterior surface and defining a bead exterior surface having an arcuate profile, the bead having a size sufficient to engage a boundary layer of the air flow and create turbulence in the airflow downstream of the bead; and
   a wiper blade coupled to the arm portion.

15. The wiper arm of claim 14, in which the bead extends substantially parallel to the arm axis and defines a bead length that is at least approximately 50% of the arm length.

16. The wiper arm of claim 15, in which the bead extends along a bead axis, in which a distal half of the bead exterior surface is located a radius distance from the bead axis, and in which the radius distance is approximately 0.025 inches.

17. The wiper arm of claim 14, in which the bead extends from the inward portion of the arm exterior surface.

18. The wiper arm of claim 17, further comprising a second bead extending from the outward portion of the arm exterior surface and defining a second bead exterior surface having an arcuate profile, the second bead having a size sufficient to engage the boundary layer of the air flow to create turbulence in the air flow downstream of the second bead.

19. The wiper arm of claim 14, in which the bead is formed integrally with the arm portion.

\* \* \* \* \*